US005178333A

United States Patent [19]

Barber et al.

[11] Patent Number: 5,178,333
[45] Date of Patent: Jan. 12, 1993

[54] AIR DISTRIBUTION APPARATUS FOR PARTICULATES

[76] Inventors: Larry Barber; James Barber, both of 1404 N. Regal, Spokane, Wash. 99202

[21] Appl. No.: 804,100

[22] Filed: Dec. 6, 1991

[51] Int. Cl.[5] .............................................. A01C 15/04
[52] U.S. Cl. .................................... 239/655; 239/654; 239/675
[58] Field of Search ............... 239/654, 655, 672, 673, 239/675; 222/630; 366/177, 181

[56] References Cited

U.S. PATENT DOCUMENTS

| | | | |
|---|---|---|---|
| 3,259,278 | 7/1966 | Barber et al. | 222/178 |
| 3,680,741 | 8/1972 | Barber | 222/177 |
| 4,462,550 | 7/1984 | Tyler | 239/655 |
| 4,489,892 | 12/1984 | Tyler | 239/650 |
| 4,522,340 | 6/1985 | Gandrud | 239/654 |
| 4,700,895 | 10/1987 | Takata | 239/664 |
| 4,705,220 | 11/1987 | Gandrud et al. | 239/654 |
| 4,790,484 | 12/1988 | Wall | 239/655 |
| 4,852,809 | 8/1989 | Davis et al. | 239/654 |
| 4,964,575 | 10/1990 | Takata | 239/655 |
| 5,018,668 | 5/1991 | Bauer | 239/655 |
| 5,028,009 | 7/1991 | Takata | 239/655 |
| 5,052,627 | 10/1991 | Balmer | 239/655 |

FOREIGN PATENT DOCUMENTS

| | | | |
|---|---|---|---|
| 3616538 | 11/1987 | Fed. Rep. of Germany | 239/655 |

OTHER PUBLICATIONS

"Now-Higher Spread Rates, Reduced Clogging and Improved accuracy With Impregnated Products," Ag--Chem Brochure, Date Unknown.
"Terra-Gator 1664T," Ag-Chem Brochure, Nov. 1989.
"Lor-Al Air-Flow Dry Sprayer," Lor-Al Corporation Brochure 1982.
"Air-Max V," Lor-Al, Inc. Brochure, 1991.
"New Lor-Al Air-Flow Dry Sprayer," Lor-Al Corporation Brochure, 1981.
"Air-Matic Impregnator," Willmar Manufacturing Brochure, Date Unknown.
"Award Winning Granular Applicators," Valmar Airflow Inc. Brochure, Date Unknown.

*Primary Examiner*—Andres Kashnikow
*Assistant Examiner*—Karen B. Merritt
*Attorney, Agent, or Firm*—Wells, St. John, Roberts, Gregory & Matkin

[57] ABSTRACT

A transverse air distribution system for field application of particulates, such as fertilizers, utilizes a plurality of pneumatic delivery tubes. The delivery tubes are arranged in two vertically stacked transverse layers. Air is supplied through a manifold chamber in communication with each layer of tubes. A metered amount of particulates is discharged into vertical chutes leading to the individual delivery tubes by operation of individual rotating metering augers. The number of metering auger outlets corresponds to the number of delivery tubes, assuring that identical amounts of particulate flow will be provided to each delivery tube during operation of the apparatus. A supporting metering housing and delivery tube housing are hinged to the vehicle frame to provide convenient access for repair, modification or cleaning of the metering system.

28 Claims, 6 Drawing Sheets

AIR DISTRIBUTION APPARATUS FOR PARTICULATES

TECHNICAL FIELD

This disclosure relates to air distribution systems for field application of chemical particulates, such as fertilizer. It is specifically directed to a novel metering system for controlling the delivery of particulates to each delivery tube in a plurality of pneumatic delivery tubes.

BACKGROUND OF THE INVENTION

Chemicals, fertilizers and other particulates (in powder or granular form) are commonly applied to agricultural fields by transverse spreaders that cover a wide swath during each pass of the equipment. The particulate distribution system can be mounted on any form of land vehicle, such as a trailer, truck or specially designed self-propelled vehicle. Normally such vehicles will carry a particulates storage hopper, a transverse distributor for spreading the particulates, and a conveyor for moving particulates from within the hopper to the distributor. Because uniformity is necessary to effective spreading of chemical particulates about a field, a metering system for measuring and allocating flow of particulates to the distributor is either included within the distributor itself or is interposed between the conveyor outlet and the receiving distributor.

One form of distributor for spreading of particulates is a relatively simple spinner. One or more rotating spinners fling particulates onto the field surface as the material is dropped onto the spinners by a delivery mechanism or conveyor. However, the accuracy of distribution in this type of system is relatively crude. The field width which can be accommodated by use of spinners is definitely limited, since variations in delivery rate become increasingly pronounced as the width of the covered swath increases.

Mechanical delivery of particulates has been accurately achieved by mounting a transverse spreader hopper across a vehicle and providing a system of baffles, apertures, agitators and/or augers along its length. One example of such system is shown in U.S. Pat. No. 3,259,278, issued Jul. 5, 1966. A later improvement in such systems is disclosed in U.S. Pat. No. 3,680,741, issued Aug. 1, 1972. As illustrated in both patents, increaed width across the distribution system was achieved by untilizing foldable hoppers that can either be arranged at the sides of a vehicle for distributing particulates at positions alongside the vehicle for transport purposes.

More recently, field application systems have been introduced which use pneumatic distribution tubes to carry particulates outwardly to each side of a vehicle. These systems are illustrated by the equipment shown in U.S. Pat. Nos. 4,462,550 and 4,964,575. In these systems, metering of incoming particulates between vertical chutes leading to the tubes is achieved by mechanically flinging the particulate material by a centrifugal deflector. Other metering systems that have been commercially used in such systems involve metering rollers, star wheels and conveyor chains. In all these systems, the particulates are simultaneously directed into a plurality of chutes as a group. They deliver particulates to multiple delivery tubes in common metering mechanism. The required proportional flow to the individual tubes is attempted to be achieved by delivering a measuring amount of particulates across all of the tubes at the same time. However, the supposition that this will reslut in the same amount of particulates being dropped into each tube fails to take into account variations that occur due to vehicle speed, ground roughness, and the inclination of the supporting ground surface and vehicle carrying the system. While such systems might accurately meter the incoming rate of flow of the particulates to the distributor, they cannot assure that accurate proportional flow of particulates will be directed to the individual pneumatic delivery tubes under all operating conditions and desired rates of application that are typically encountered in field usage.

The change from mechanical to pneumatic distribution systems was dictated by a desire to reduce the operational weight of the wings or booms extending to the sides of the vehicle. In a pneumatic system, no particulate material is stored or maintained across the distributor. The distribution system is "dynamic"—all particulates that are in the distributor remain in motion once delivered to the pneumatic delivery tubes. In addition, the pneumatic tubes are lighter than the metering mechanism required in a mechanical system, thereby reducing the weight that must be supported across extended wings or booms. Finally in those instances where the wings or booms encounter a fixed object or pole while travelling in a field, the pneumatic tubes are much simpler to replace or repair.

One trade-off encountered when moving from a mechanical distributor system to a pneumatic system is that the pneumatic system typically discharges particulates at much wider spacings than have been used in comparable mechanical systems. Because the mechaincal systems used a common metering auger across the bottom of the distributor hopper, it was practical to discharge pariculates at 6 inch intervals across the system. After allowing for free fall of the particulates onto a field surface, this relatively close spacing assured substantially uniform application of particulates across the area being treated. Since each outlet along a pneumatic distributor system requires a separate pneumatic delivery tube, it is common to space the pneumatic outlets in the range of 30–36 inches apart from one another. The greater spacing is somewhat accommodated by the fact that the particulates are forcibly ejected from the delivery tubes by a flowing airstream, which permits the tubes to be provided with angular deflectors in an attempt to form uniform application patterns across the system. However, nonuniform flow of particulates through the individual delivery tubes will obviously impact a much wider swath across the field than would variations in delivery of particulates to the more closely spaced outlets in a mechanical system.

In order to assure more accurate and uniform distribution of particulates in a air distribution system, the present disclosure was directed to a system for individually metering the flow of particulates into each pneumatic delivery tube. A separate metering conveyor or auger is provided for each delivery tube, insuring that changes in vehicle inclination or in the rates of particulate application do not affect one delivery tube differently from one another. The result of this system has been a markedly improved uniformity of application across relatively wide field areas. The metering assembly also lends itself to a double stack of horizontally layered delivery tubes, permitting more tubes to be provided along the supporting wings or booms and allowing the tube outlets to be more closely spaced at intervals of 20 inches, as an example.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

Figure 1:
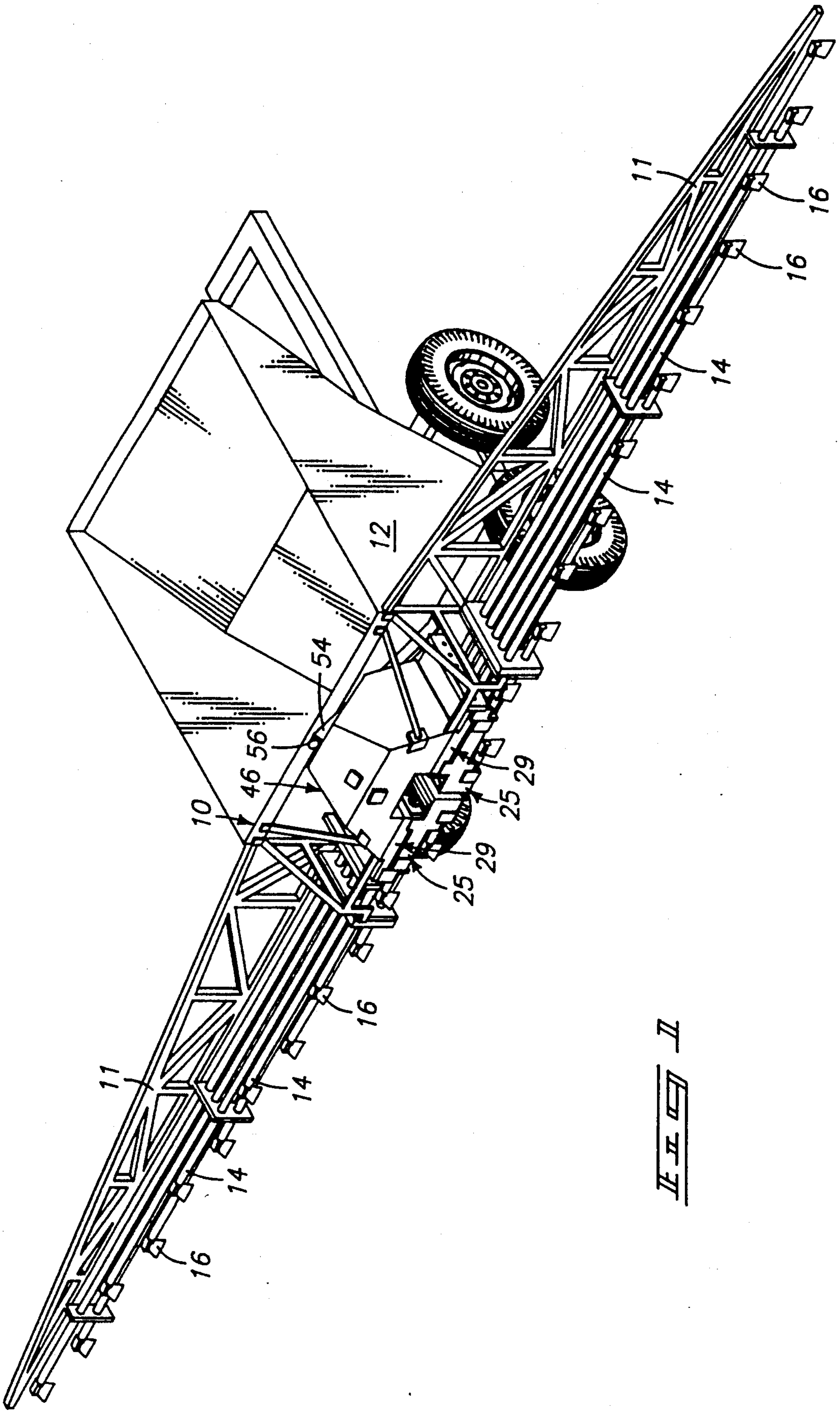
FIG. 1 is a perspective view of the distribution system as seen from the rear of the supporting vechicle.

This disclosure of the invention is submitted in furtherance of the constitutional purposes of the U.S. Patent Laws "to promote the progress of science and useful arts" (Article 1, Section 8).

The air distribution system shown in the drawings is designed to be mounted across a vehicle frame 10. Frame 10 can be self propelled or trailed behind a propelling land vehicle (not shown). It is provided with a large volume storage hopper 12 for holding a supply of one or more particulates. In most instances, the air distribution apparatus will be arranged across the rear end of the vehicle frame 10 at a location adjacent to the hopper 12.

The air distribution apparatus utilizes a plurality of elongated delivery tubes 14. When designed for discharge of particulates across a wide swath, the delivery tubes 14 are typically supported on hinged wings or booms 11 that can be folded alongside the vehicle frame 10 for transport purposes. The wings or booms 11 are hinged to the vehicle frame for folding purposes, but details of this feature have been omitted from this disclosure because they are well-known and not vital to an understanding of the present invention.

Each delivery tube 14 has longitudinally spaced inboard and outboard sections for respectively receiving and discharging particulates. Their outboard sections, which are transversely spaced from one another in a repetitive sequence across the width of the apparatus, are provided with angular deflectors 16. Deflectors 16 are adapted to project the particulates in a relatively uniform distribution pattern across the field area under the delivery tubes.

In the illustrated embodiment, the delivery tubes 14 are vertically stacked in two horizontal layers. Paired delivery tubes 14 in the two horizontal layers are vertically aligned with one another. While not essential to the practice of the invention, the stacking of the layered tubes reduces the overall width of the tube assembly by a factor of two.

The following description will detail one side of the air distribution apparatus illustrated in the drawings. It is to be understood that the two sides of the illustrated apparatus are identical in structure and operation, but are mirror images of one another and symmetrical across the center line of the apparatus.

Figure 4:
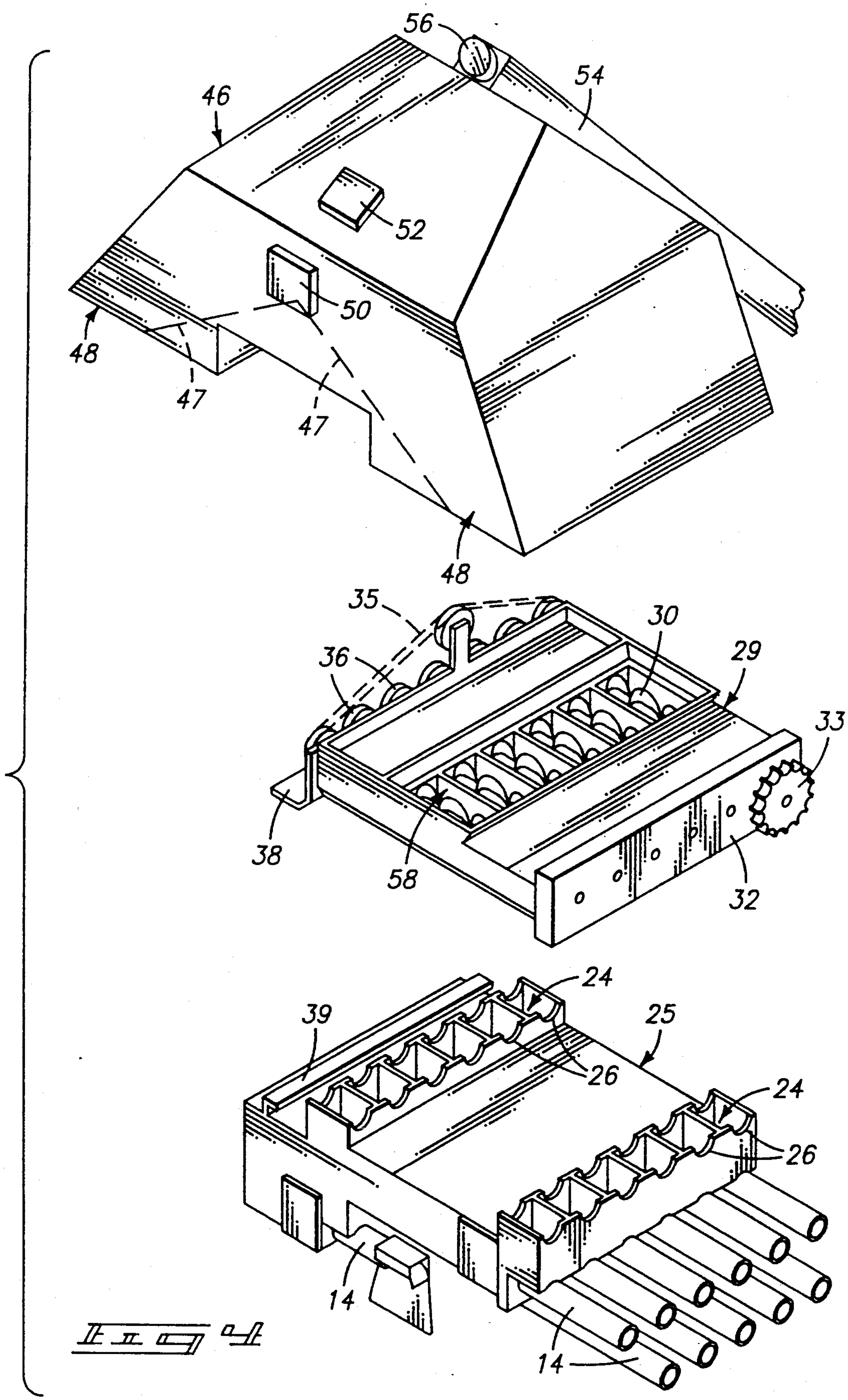
FIG. 4 is an exploded perspective view illustrating the distributor system.
Figure 5:
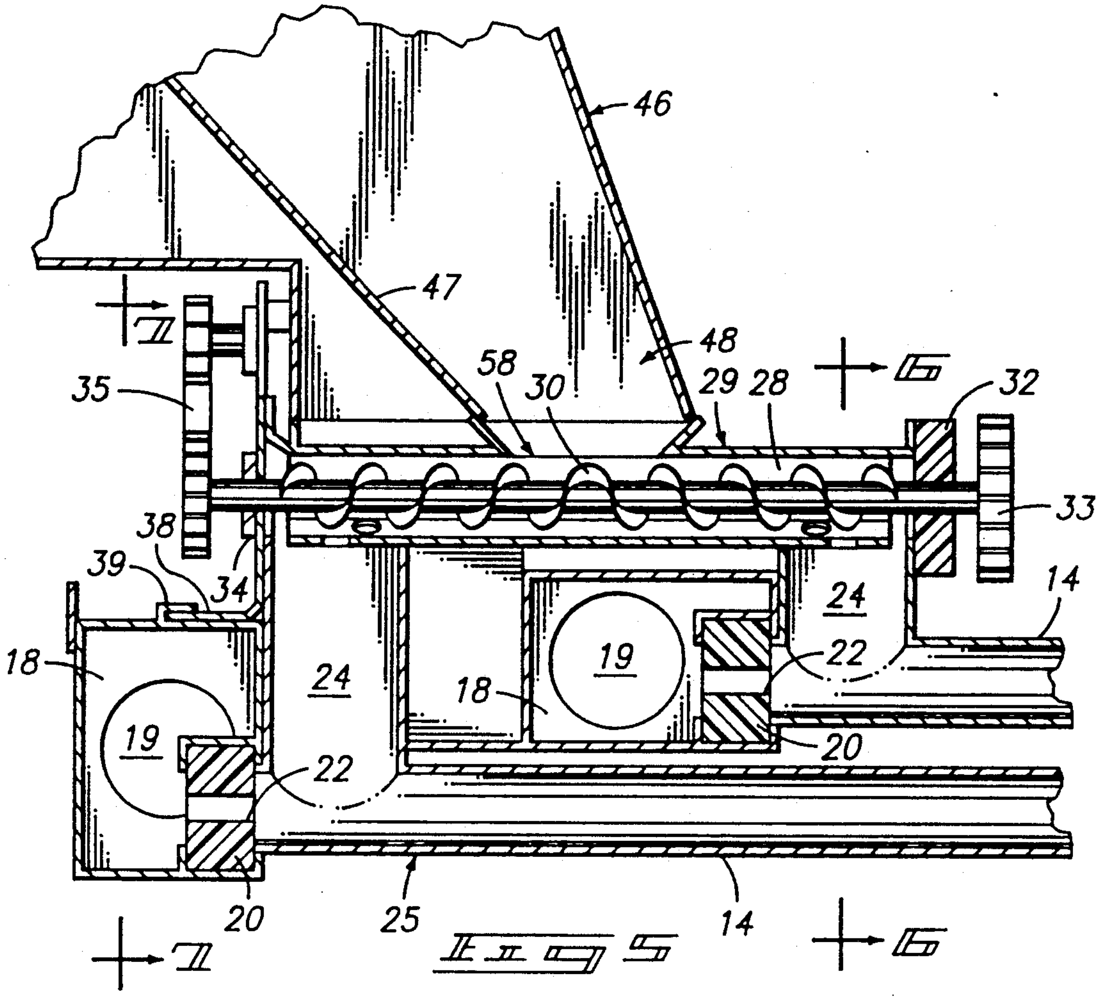
FIG. 5 is an enlarged fragmentary sectional view along one metering auger as seen generally along line 5—5 in FIG. 3.
Figure 6:
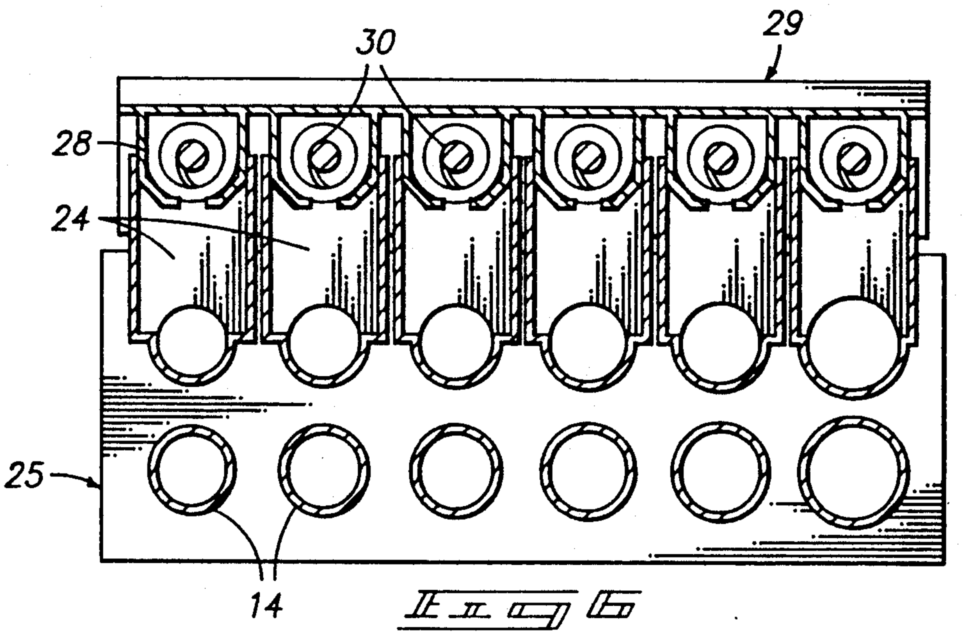
FIG. 6 is a transverse sectional view taken along line 6—6 in FIG. 5.

The inboard sections of the layered delivery tubes 14 are housed within a supporting delivery tube housing, generally designated by the reference numeral 25. Its structure is best seen in FIGS. 4–6.

Figure 7:
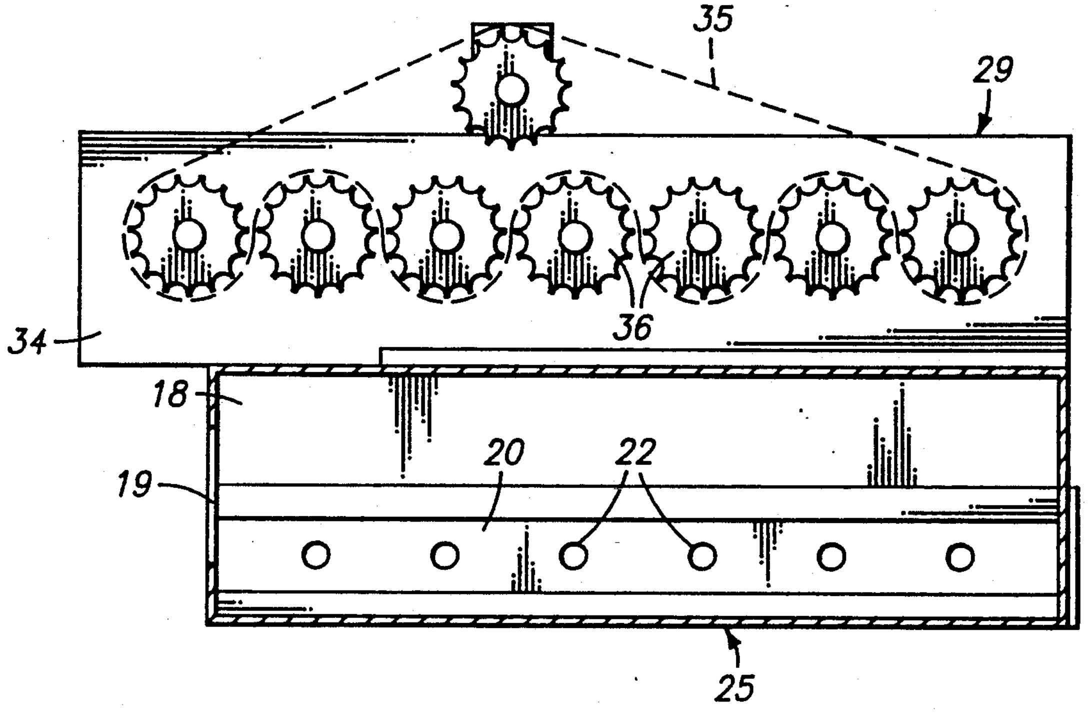
FIG. 7 is a transverse sectional view taken along line 7—7 in FIG. 5.

Air supply means is provided for introducing flowing air into the individual delivery tubes 14 at positions adjacent to their respective inboard ends. The illustrated distribution apparatus includes a pair of air manifold chambers 18 transversely and elevationally offset from one another across the inboard ends of the delivery tubes 14 in the two horizontal layers (FIGS. 5 and 7).

The inboard sections of the individual delivery tubes 14 lead to common air manifold chambers 18 which extend across the inner ends of each delivery tube layer. Each air manifold chamber 18 is provided with an air inlet 19 through which flowing air is supplied to its interior. Air inlets 19 can be supplied with air by flexible conduits leading to a blower (not shown) located on the vehicle frame 10 or on the towing vehicle for the apparatus.

A common nozzle block 20 is interposed between the interior of each air manifold chamber 18 and the interiors of the individual delivery tubes 14 supplied with flowing air from within it. The nozzle block 20 includes apertures 22 formed through it to project axial jets of air from within the air manifold chamber 18 to the inboard ends of the individual delivery tubes 14. The several nozzle apertures 22 formed in each block 20 can vary in size to accommodate tubes of differing diameter or to provide the volume of air required to project particulates the full length of each tube.

Each delivery tube 14 has a vertical chute 24 leading to its interior directly adjacent to its inboard end. Particulates are directed into the individual delivery tubes 14 through the vertical chutes that intersect them (FIGS. 5 and 6). The upper ends of the chutes 24 present a series of arcuate or scalloped recesses 26 across the delivery tube housing 25 (see FIG. 4), which in turn mate with the lower surfaces of a series of parallel metering troughs 28.

The troughs 28 are provided within a metering housing 29. The metering housing 29 is releasably attached to the previously-described delivery tube housing 25. It also is best seen in FIGS. 4–6.

Troughs 28 are horizontally positioned above and parallel to the inboard sections of the delivery tubes 14. The troughs 28 have an inlet 58 for particulates, illustrated as a central opening shared across the several troughs in each metering housing 29. Each trough has at least one outlet displaced longitudinally from its inlet. Because the illustrated troughs 28 each feed particulates to a stacked pair of delivery tubes located below it within the two illustrated layers, the illustrated metering troughs 28 are provided with particulate outlets at both of their extended ends.

The outlets of troughs 28 are illustrated as open apertures 40. In addition, the outer ends of the metering troughs 28 are in open communication with the surrounding chutes 24 to permit particulates to drop into the chutes from the ends of the troughs when the volume of particles being supplied requires a greater exit area.

A plurality of rotatable elongated augers 30 are provided within the metering troughs 28. The augers 30 are rotatably mounted within the respective troughs with each auger extending longitudinally across both the inlet 58 and at least one outlet of the trough. Because the augers are illustrated as being double-ended, each of the illustrated augers 30 extends across both the inlet 58 and outlets at opposite ends of the associated trough 28.

The illustrated augers include right and left hand sections that meet at the center of each auger to divide flow of particulates from the center inlet 58 to their opposed ends. The drawings illustrate a single flight auger, but commercial versions of this equipment have utilized double flight augers so as to more closely space the flights and optimize even flow of particulates along the trough surfaces.

Augers 30 are rotatably supported between an outer support plate 32 across metering housing 29 and an inner support plate 34. The forward auger shaft in each metering housing 29 extends beyond outer support plate 32 and carries a driven gear 33. Gear 33 is powered by interconnecting chains wrapped about a driving sprocket 43 on cross shaft 42 on the vehicle frame 10. Cross shaft 42 also has a driven sprocket 44 fixed to it, which can be powered by any drive system.

Since it is preferred that the metering of particulates be proportional to vehicle speed, the driving sprocket 43 will normally be powered from a power take-off (not shown) connected to a ground engaging wheel on the vehicle frame 10. The details of such a power take-off arrangement are well known in the agricultural implement industry and have previously been utilized in other forms of metering equipment for fertilizer and particulate spreaders. They are not believed to be necessary to a complete understanding of the present apparatus.

The inner ends of augers 30 are drivingly interconnected by a chain 35 wrapped about over the top and bottom of adjacent driving gears 36 fixed to the respective auger shafts at locations inwardly adjacent to the support plate 34 on the metering housing 29. Adjacent augers 30 are thereby driven in opposite directions of rotation about their respective axes. The reversal of rotational direction between adjacent augers 30 is accommodated by reversing their helical directions so that each will move particulates from its center to its outer ends when it is rotated about its auger axis.

The illustrated drive means for rotating the individual augers 30 is operative to move a predetermined flow of particulates from the inlet of each metering trough 28 to its outlet(s), where the particulates drop into the individual delivery tubes 14. By uniformly driving the various augers 30, uniform flow of particulates to each delivery tube 14 is assured at all times.

Particulate material is directed into the inlet 58 of the augers 30 through a receiving hopper 46 at the rear of the air distribution apparatus. The hopper 46 is supplied with particulates by operation of a conventional bulk conveyor, shown as a supply auger 54 leading from the bottom of hopper 12 to the upper end of hopper 46. Supply auger 54 can be driven by a controllable hydraulic motor 56.

The receiving hopper 46 includes sloping lower walls 47 which bifurcate it into two sections leading to the metering housings 29 at the two sides of the illustrated air distribution apparatus. The outer or lower ends of the sloping lower walls 47 define lower discharge sections 48 for the receiving hopper 46.

The discharge sections at the two sides of receiving hopper 46 are intended to be filled with particulates during operation of the air distribution apparatus. The level of particulates is detected by a lower sensor 50 (that defines the minimum particulate height) and an upper sensor 52 (that defines the maximum particulate height). Sensors 50 and 52 control operation of motor 56 to maintain the discharge sections 48 and metering troughs 28 in a filled condition during operation of the equipment. In view of this filled condition, the rate of delivery of particulates into the individual delivery tubes 14 will be a direct function of the operation of the augers 30. The transverse or longitudinal inclination of the vehicle frame at any given time will not affect the rate of delivery of particulates to the individual delivery tubes 14.

The inboard sections of delivery tubes 14, which are joined to one another within delivery tube housing 25, are hinged relative to the vehicle frame 10 at 60. The hinge axis is parallel to the length of vehicle frame 10 in its intended direction of travel.

Figure 2:
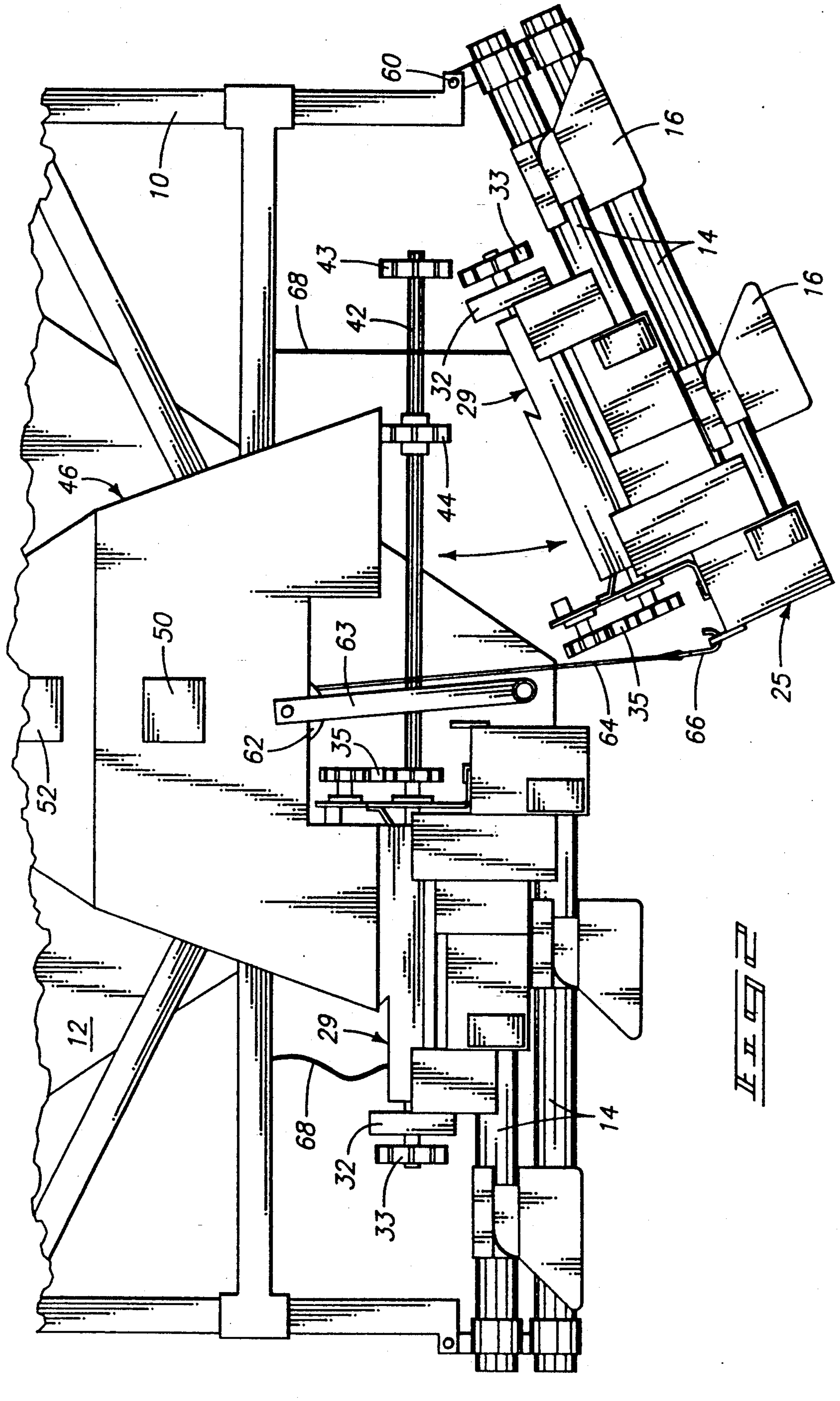
FIG. 2 is a fragmentary rear view of the distribution system across the back of the supporting vehicle.
Figure 3:
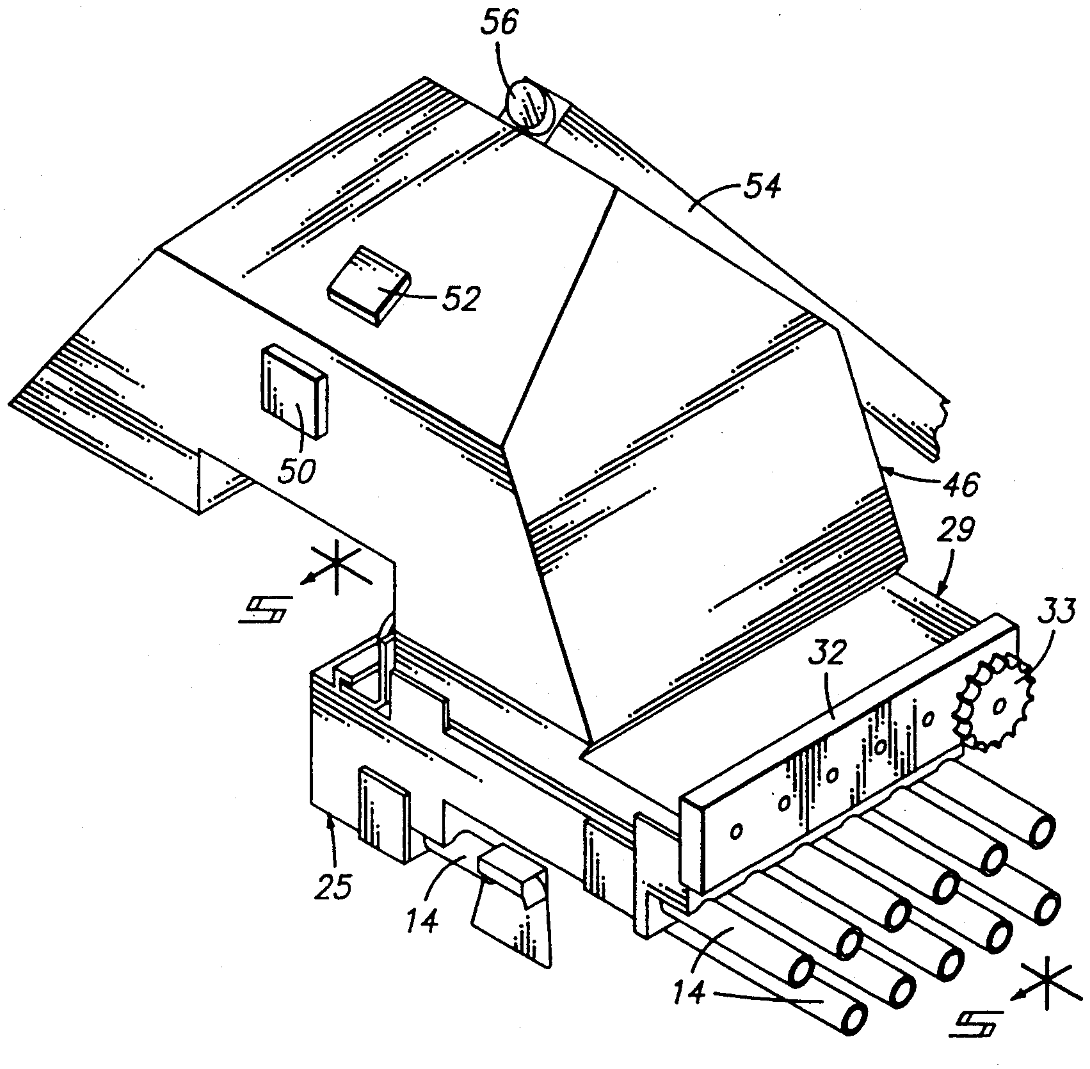
FIG. 3 is a perspective assembly view showing one side of the distribution system.

The delivery tube housing 25, which normally supports the metering housing 29, can be moved about hinge 60 in the manner illustrated generally in FIG. 2. Suitable latches (not shown) are provided between the delivery tube housing 25 and the vehicle frame 10 to normally maintain the delivery tubes 14 in a transverse horizontal orientation across the vehicle frame 10. When in this orientation, as shown to the left in FIG. 2, the inlet 58 across the metering housing 29 is directly below one lower discharge section of receiving hopper 46.

When it is desired to repair, modify or clean the metering equipment, the interconnected delivery tube housing 25 and metering housing 29, including the inboard sections of delivery tubes 14, can be lowered about hinge 60 as shown to the right in FIG. 2. This is accomplished by progressively releasing a strap 64 hooked to the inner end of metering housing 29 and wound about a pulley 62.

Strap 64 is controlled by a hand crank 63. The lower end of strap 64 is releasably attached to a bracket at the inner end of delivery tube housing 25 by a releasable hook 66. The same hook 66 and strap 64 can alternately be used to lower or raise the air distribution apparatus at either side of the illustrated equipment. The lowermost hinged position of the apparatus is defined by a limit cable 68 fixed between vehicle frame 10 and delivery tube housing 25. After the weight of the unit has been transferred to cable 68, tension on strap 64 can be released and hook 66 can be freed, permitting them to be subsequently used in the same manner to control pivotal movement of the corresponding delivery tube housing 25 and metering housing 29 at the opposite side of the air distribution apparatus. Metering housing 29 is also separable from the delivery tube housing 25. To remove it, one must release the drive chain leading to driven gear 33 and must also release a latch mechanism (not shown) that locks the outer end of metering housing 29 to the supporting delivery tube housing 25. The outer end of housing 29 can then be lifted slightly to clear the arcuate recesses 26 and allow a projecting ledge 38 on the housing 29 to be pulled rearwardly and slide along a receiving channel 39 at the inner end of the delivery tube housing 25. The separated housings 25 and 29 are best seen in FIG. 4.

Figure 8:
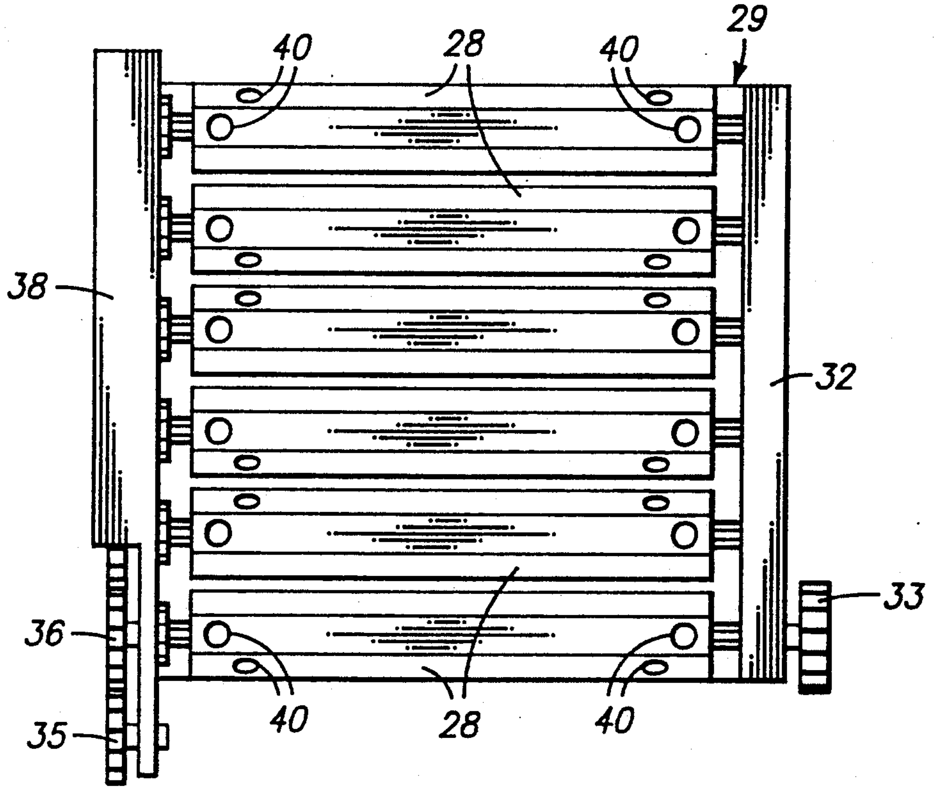
FIG. 8 is a bottom view of the removable metering cartridge containing the metering augers.

The outlets at the ends of metering troughs 28 are illustrated as two separate apertures 40 that are angularly and axially spaced in the direction of rotation of the associated auger flights above them (see FIG. 8). The use of multiple apertures of a size less than that required for maximum particulate flow helps to assure even flow of particulates at all flow conditions. At low flow rates, most of the particulates will drop through the first axial aperture 40. At higher flow rates, additional amounts of particulate material will drop through the second aperture 40 as well. At maximum flow rates, the particulate materials will drop through both apertures 40 and across the outer ends of the troughs 28. The spreading of the discharge of particulates through multiple outlet apertures helps to minimize pulsations that otherwise occur when moving particulates by a rotating auger.

Particulates are maintained within the receiving hopper 46 at an elevation between the sensors 50 and 52 during operation of the particulate distribution apparatus. This maintains both lower discharge sections 48 and the metering troughs 28 in full conditions for field distribution purposes. The rate of delivery of particulates is controlled by the rotational speeds of the augers 30. It is also a function of vehicle speed and the size relationships of the augers. troughs, and the sprockets within the drive train that interconnects them to the wheels of the supporting vehicle.

The augers 30 individually deposit particulates into the chutes 24, allowing measured amounts of particulates to fall into the moving air streams created by air manifold chambers 18 and nozzle apertures 22. It can be seen that the delivery tubes 14 will each receive an identical continuous supply of particulates, regardless of the distance separating its inboard and outboard ends. While greater amounts of air and larger diameter delivery tubes are desirable with respect to those feeding to the end of the wing or boom 11 at each side of the vehicle, the amount of particulate material delivered to each of them is preferably identical (assuming that their outlets are identical and evenly spaced across the apparatus).

Should the vehicle stop at any time, no particulate material will be metered until motion is reinstated. At that point, the augers 30 will immediately resume metered delivery of particulates. Intermittent stoppage does not affect even distribution of particulates, since the augers 30 are designed to operate with the metering troughs 28 in a totally filled condition.

The delivery tube housing 25 and metering housing 29 can be readily dropped about the supporting hinge connection 60, and the two can be separated for repair, modification or cleaning purposes. Naturally, they will not normally be dropped without first emptying all particulates within the receiving hopper 46 and metering troughs 28. This can be accomplished by controls that override operation of lower sensor 50 within the receiving hopper 46.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An air distribution apparatus for field application of particulates, comprising:

a boom having a plurality of elongated delivery tubes having longitudinally spaced inboard and outboard sections for respectively receiving and discharging particulates;

air supply means for introducing flowing air into each delivery tube;

a plurality of troughs positioned above the inboard sections of the delivery tubes, each trough having an upwardly open inlet and at least one outlet displaced longitudinally from its inlet, the outlets corresponding in number to the number of delivery tubes, each outlet being in open communication with the interior of a single one of the delivery tubes at a location in its inboard section that is downstream from the introduction of flowing air by the air supply means;

a plurality of rotatable elongated augers, the augers being rotatably mounted within the troughs with each auger extending longitudinally across both the inlet and at least one outlet of the trough within which it is mounted; and drive means for rotating the individual augers to move a predetermined flow of particulate solids between the respective inlets and outlets along each trough and into the delivery tubes.

2. The apparatus of claim 1, further comprising:

a gravitational chute leading from each outlet of the troughs to the interior of a delivery tube.

3. The air distribution apparatus of claim 1, wherein the delivery tubes are vertically stacked in horizontal layers along the boom.

4. The air distribution apparatus of claim 1, wherein the air supply means comprises:

a common air manifold in open communication with the inboard sections of the delivery tubes.

5. An air distribution apparatus for field application of particulates, comprising:

a land vehicle;

a boom having a plurality of elongated delivery tubes extending to the side of the vehicle and having longitudinally spaced inboard and outboard sections for respectively receiving and discharging particulates;

hopper means on the vehicle for storing particulates;

air supply means for introducing flowing air into the individual delivery tubes at their inboard sections;

a plurality of substantially horizontal troughs positioned above the inboard sections of the delivery tubes, each trough having an inlet and at least one outlet displaced longitudinally from its inlet, each outlet being in open communication with the interior of a single one of the delivery tubes at a location in its inboard section that is downstream from the introduction of flowing air by the air supply means;

conveying means on the vehicle for directing particulates from the hopper means to the inlets of the troughs;

a plurality of elongated augers rotatably mounted within the troughs, each auger extending longitudinally across both the inlet and at least one outlet of the trough within which it is mounted; and drive means for rotating the individual augers to move a predetermined flow of particulates between the respective inlets and outlets along each trough and into the delivery tubes.

6. the apparatus of claim 5, further comprising:
a gravitational chute leading from each outlet of the troughs to the interior of a delivery tube.

7. The air distribution apparatus of claim 5, wherein the delivery tubes are vertically stacked in horizontal layers along the boom.

8. The air distribution apparatus of claim 5, wherein the delivery tubes are vertically stacked in two horizontal layers with paired delivery tubes being vertically aligned with one another along the boom.

9. The air distribution apparatus of claim 5, wherein the delivery tubes are vertically stacked in two horizontal layers with paired delivery tubes being vertically aligned with one another along the boom;
each trough being aligned above one pair of delivery tubes and having an outlet to each side of its inlet, the individual outlets being in open gravitational communication with the upper and lower delivery tubes of the pair under each trough, respectively.

10. The air distribution apparatus of claim 5, wherein the air supply means comprises:
a common air manifold in open communication with the inboard sections of the delivery tubes.

11. The air distribution apparatus of claim 5, wherein the air supply means comprises:
a common air manifold in open communication with the inboard sections of the delivery tubes; and
individual air nozzles interposed between the air manifold and the interior of each delivery tube in open communication with it.

12. The air distribution apparatus of claim 5, wherein the delivery tubes are vertically stacked in horizontal layers along the boom;
the air supply means comprising:
common air manifolds in open communication with the inboard sections of the delivery tubes in each horizontal layer.

13. The air distribution apparatus of claim 5, wherein the delivery tubes are vertically stacked in horizontal layers along the boom;
the air supply means comprising:
common air manifolds in open communication with the inboard sections of the delivery tubes in each horizontal layer, the manifolds being longitudinally spaced apart from one another along the delivery tubes.

14. An apparatus for field application of particulates, comprising:
a boom having a delivery tube assembly extending to one side of a supporting vehicle, including a plurality of substantially horizontal delivery tubes arranged side-by-side in parallel positions, each delivery tube having an inboard section positioned at a central distribution station on the vehicle;
a receiving hopper including a gravitational discharge located above the boom at the distribution station;
a conveyor for maintaining a predetermined level of particulates within the receiving hopper;
air supply means for introducing flowing air into the individual delivery tubes at locations adjacent to their inboard sections;
metering means interposed between the discharge of the receiving hopper and the delivery tubes for directing a predetermined flow of particulates into each delivery tube, the metering means comprising:
a plurality of substantially horizontal troughs individually aligned at positions vertically above and parallel to the inboard sections of the respective delivery tubes, each trough having an inlet in open gravitational communication with the receiving hopper and at least one outlet displaced longitudinally from its inlet, eahc outlet being in open communication with the interior of a single one of the delivery tubes at a location in its inboard section that is downstream from the introduction of flowing air by the air supply means; the outlet of each trough being in open gravitational communication with the interior of a delivery tube aligned under it;
a plurality of elongated augers rotatably mounted within the troughs, each auger extending longitudinally across both the inlet and at least one outlet of the trough within which it is mounted; and drive means for rotating the individual augers.

15. The apparatus of claim 14, further comprising:
a gravitational chute leading from each outlet of the troughs to the interior of a delivery tube.

16. The air distribution apparatus of claim 14, wherein the delivery tubes are vertically stacked in horizontal layers along the boom.

17. The air distribution apparatus of claim 14, wherein the delivery tubes are vertically stacked in two horizontal layers with paired delivery tubes being vertically aligned with one another along the boom.

18. The air distribution apparatus of claim 14, wherein the delivery tubes are vertically stacked in two horizontal layers with paired delivery tubes being vertically aligned with one another along the boom;
each trough being aligned above one pair of delivery tubes and having an outlet to each side of its inlet, the individual outlets being in open gravitational communication with the upper and lower delivery tubes of the pair under each trough, respectively.

19. The air distribution apparatus of claim 14, wherein the air supply means comprises:
a common air manifold in open communication with the inboard sections of the delivery tubes.

20. The air distribution apparatus of claim 14, wherein the air supply means comprises:
a common air manifold in open communication with the inboard sections of the delivery tubes; and
individual air nozzles interposed between the air manifold and the interior of each delivery tube in open communication with it.

21. The air distribution apparatus of claim 14, wherein the delivery tubes are vertically stacked in horizontal layers along the boom;
the air supply means comprising:
common air manifolds in open communication with the inboard sections of the delivery tubes in each horizontal layer.

22. The air distribution apparatus of claim 14, wherein the delivery tubes are vertically stacked in horizontal layers along the boom;
the air supply means comprising:
common air manifolds in open communication with the inboard sections of the delivery tubes in each horizontal layer, the manifolds being longitudinally spaced apart from one another along the delivery tubes.

23. The air distribution apparatus of claim 14, wherein the receiving hopper is bifurcated and includes two laterally spaced gravitational discharges located above the respective inboard sections of delivery tubes of the boom and a similar boom extending to the opposite side of the vehicle.

24. The air distribution apparatus of claim 14, wherein the receiving hopper further comprises:

sensing means operatively connected to the conveyor for maintaining its gravitational discharge full of particulates during operation of the apparatus.

25. The air distribution apparatus of claim 14, wherein the inboard sections of the delivery tubes are movably mounted on the vehicle relative to the receiving hopper.

26. The air distribution apparatus of claim 14, wherein the inboard sections of the delivery tubes are movably mounted on the vehicle relative to the receiving hopper and the metering means is releasably connected to the inboard sections of the delivery tubes.

27. The air distribution apparatus of claim 14, wherein the trough outlets each comprise at least two open apertures formed through the troughs to accommodate varying rates of particulate delivery and even flow to the delivery tubes.

28. An apparatus for field application of particulates, comprising:

a pair of delivery tube assemblies extending to opposite sides of a supporting vehicle, each assembly including a plurality of substantially horizontal delivery tubes arranged side-by-side in parallel positions, each delivery tube having an inboard section positioned at a central distribution station on the vehicle;

a bifurcated receiving hopper including a pair of gravitational discharges located above the distribution station;

a conveyor for maintaining a predetermined level of particulates within the gravitational discharges of the receiving hopper;

air supply means for introducing flowing air into the individual delivery tubes at locations adjacent to their inboard sections;

metering means interposed between the discharge of the receiving hopper and the delivery tubes for directing a predetermined flow of particulates into each delivery tube, the metering means comprising:

a plurality of substantially horizontal troughs individually aligned at positions vertically above and parallel to the inboard sections of the respective delivery tubes, each trough having an inlet in open gravitational communication with the receiving hopper and at least one outlet displaced longitudinally from its inlet, each outlet being in open communication with the interior of a single one of the delivery tubes at a location in its inboard section that is downstream from the introduction of flowing air by the air supply means;

a plurality of rotatable augers extending respectively within the individual horizontal troughs, each auger traversing both the inlet and outlet of the horizontal trough within which it extends; and drive means for rotating the individual augers.

* * * * *